United States Patent

[11] 3,624,815

| [72] | Inventor | Michael Schweitzer<br>Southington, Conn. |
|---|---|---|
| [21] | Appl. No. | 6,081 |
| [22] | Filed | Jan. 27, 1970 |
| [45] | Patented | Nov. 30, 1971 |
| [73] | Assignee | Textron Inc.<br>Providence, R.I. |

[54] BALL RETAINER AND BEARING
14 Claims, 8 Drawing Figs.

[52] U.S. Cl............................................... 308/201,
308/193
[51] Int. Cl........................................... F16c 33/38
[50] Field of Search.......................... 308/193,
201, 195, 217

[56] References Cited
UNITED STATES PATENTS

| 2,360,419 | 10/1944 | Hickling | 308/201 |
|---|---|---|---|
| 1,179,135 | 4/1916 | Oldfield | 308/201 |

FOREIGN PATENTS

| 166,139 | 2/1959 | Sweden | 308/201 |

Primary Examiner—Martin P. Schwadron
Assistant Examiner—R. H. Lazarus
Attorney—Sandoe, Hopgood and Calimafde ABSTRACT: The invention contemplates the particular construction of a bearing-ball retainer whereby not only may the ball complement be fully assembled to the retainer prior to bearing-ring assembly therewith but also the retainer-and-ball subassembly may be selectively assembled to and disassembled from a double-shouldered race ring for unitary handling therewith. The foregoing is achieved solely by coaction between the race ring and the retainer ring, without permanent deformation of any parts, and without requiring any additional parts. Bearing assembly is completed using a single-shouldered (i.e., open end) construction for the other race ring, so that the preassembled ring with retained balls may be manipulated as a unit into overlap with the open or nonshouldered end of the said other race ring.

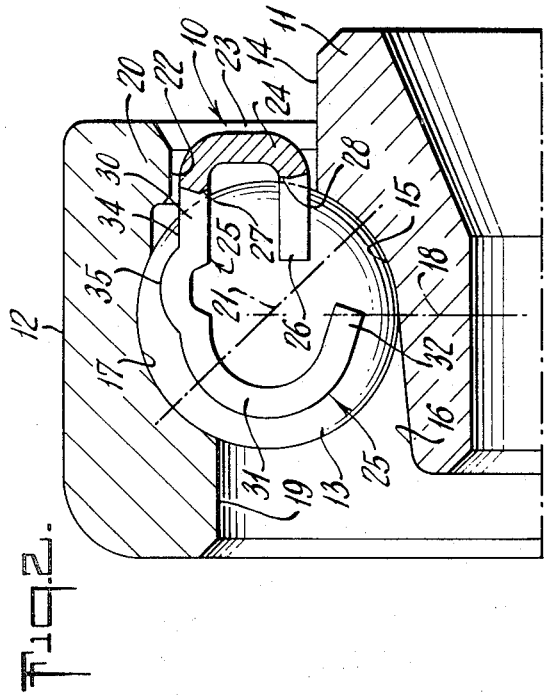
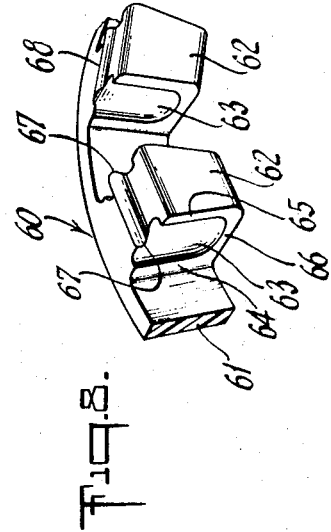
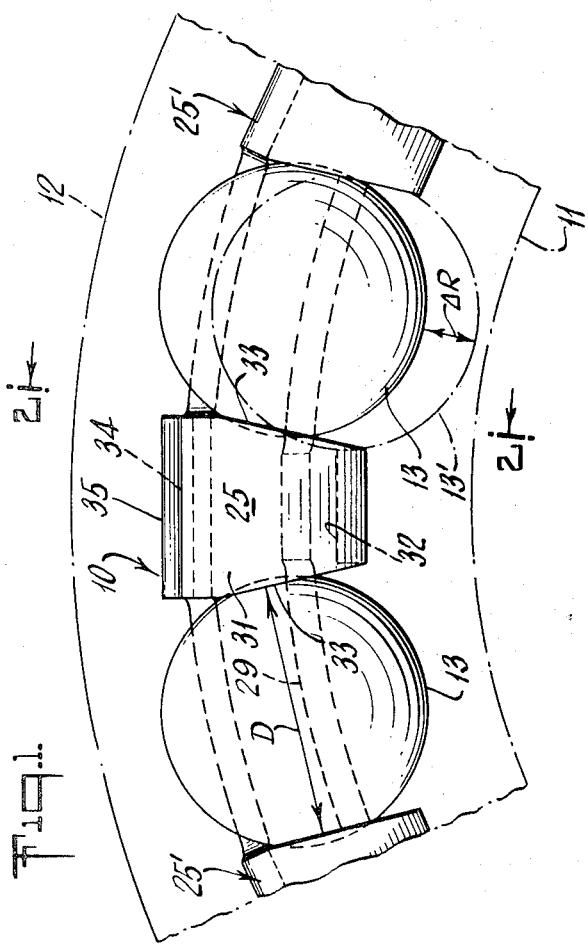
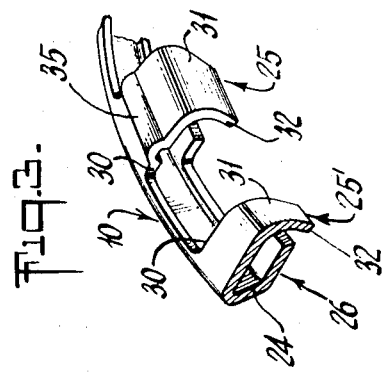

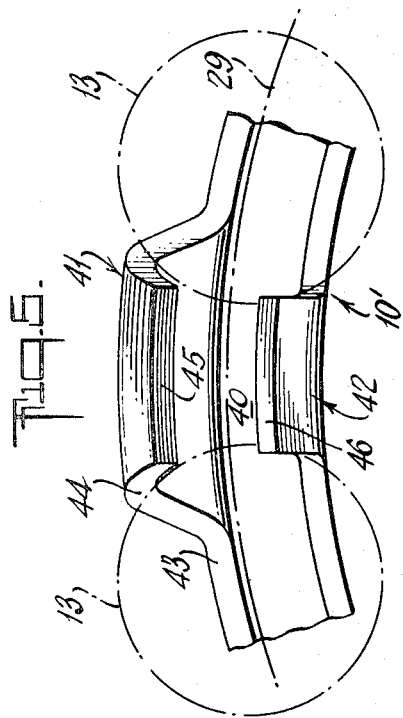
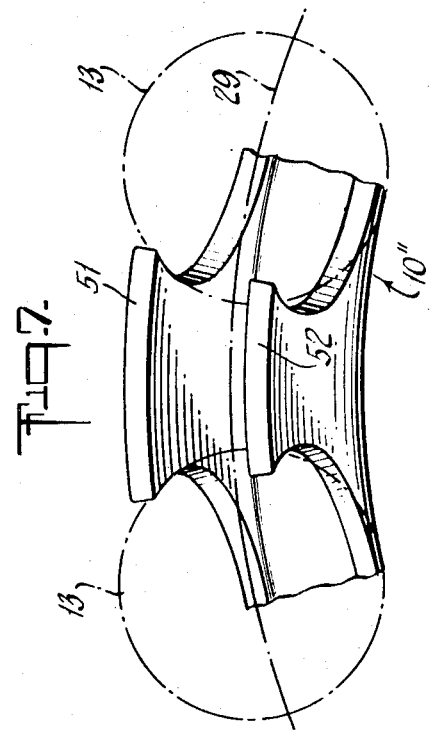
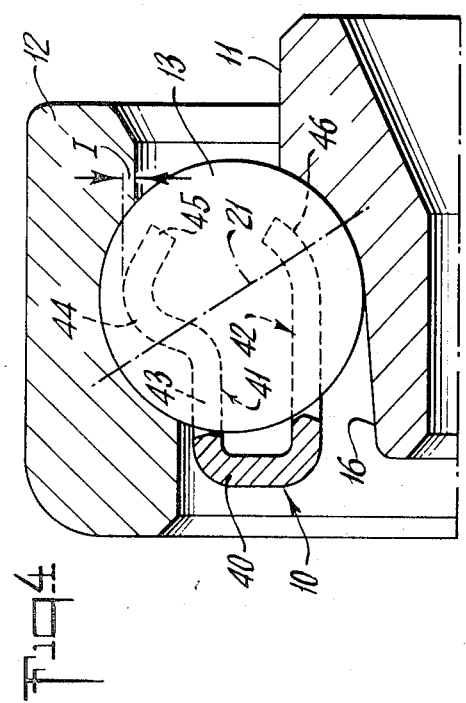
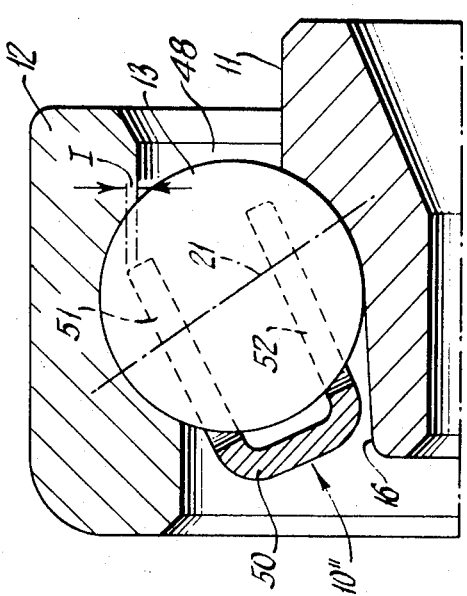
INVENTOR
MICHAEL SCHWEITZER
BY
Sandoe, Hopgood & Calimafde
ATTORNEYS

BALL RETAINER AND BEARING

This invention relates to ball bearings and in particular to means for retaining balls for the angular contact variety of such bearings.

So-called angular contact ball bearings sustain heavy axial thrust as well as radial load and should be periodically inspected, for servicing and possible other maintenance. Due to the high loads, a relatively large ball complement is provided, and ball separators or retainers are needed. In certain past constructions, the balls have been assembled to their retainers, for use between inner and outer rings which are cut away at opposite nonshouldered ends, in view of reliance upon the shouldered ends to take the thrust component of the load. In other cases, the retainer has been applied and crimped into final shape after the balls have been assembled to a double-shouldered ring.

It is an object of the invention to provide an improved construction of the character indicated, wherein no permanent deformation of the retainer occurs upon assembly to one or the other of the bearing race rings.

Another object is to provide an improved construction wherein the bearing balls and their retainer may be preassembled to each other and yet they may be also selectively assembled to a double-shouldered race ring, into unit-handling relation therewith, thereby facilitating mounting and assembly operations.

A specific object is to achieve the above objects with a construction in which transient local two-way acting resilient detent action is relied upon for selective retention of the ball-retainer subassembly to the double-shouldered race ring.

A general object is to achieve the foregoing objects with relatively simple parts, without requiring additional parts, and in a manner to entail less costly assembly and maintenance without impairing quality of performance.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is an enlarged fragmentary view in end elevation of a subassembly of bearing balls in a retainer of the invention;

FIG. 2 is a fragmentary sectional view generally in the plane 2—2 of FIG. 1 and additionally showing race rings in section;

FIG. 3 is a fragmentary perspective view of the retainer of FIGS. 1 and 2;

FIGS. 4 and 5 are views respectively corresponding to FIGS. 2 and 1, to show a first alternative;

FIGS. 6 and 7 are also views respectively corresponding to FIGS. 2 and 1, but to show a second alternative; and FIG. 8 is a view similar to FIG. 3 to show a further alternative.

Briefly stated, the invention contemplates the particular construction of a bearing-ball retainer whereby not only may the ball complement be fully assembled to the retainer prior to bearing-ring assembly therewith but also the retainer-and-ball subassembly may be selectively assembled to and disassembled from a double-shouldered race ring for unitary handling therewith. The foregoing is achieved solely by coaction between the race ring and the retainer ring, without permanent deformation of any parts, and without requiring any additional parts. Bearing assembly is completed using a single-shouldered (i.e., open end) construction for the other race ring, so that the preassembled ring with retained balls may be manipulated as a unit into overlap with the open or nonshouldered end of the said other race ring.

Referring to FIGS. 1 to 3 of the drawings, the invention is shown in application to the ball retainer 10 for an angular contact bearing, comprising inner and outer race rings 11–12, with a complement of balls 13 therebetween. Due to the unidirectional thrust load to be sustained by the assembled bearing, high shoulders characterize the thrust-loaded ends of the rings 11–12. In the case of the inner ring 11, the high shoulder 14 extends radially outward on one axial side of the arcuate inner raceway 15; the other end of the inner ring is open (i.e., nonshouldered), being shown with a gently tapered conical ramp which leads to the bottom of the raceway 15. The outer ring 12 has a similar raceway 17 of matching arcuate sectional contour but extending on both axial sides of the radial plane 18 of ball centers. Raceway 17 thus characterizes the space between two radial shoulders 19–20 in the bore of the outer ring 12, and the shoulder 19 is of bulk and extent to match that of shoulder 14, for anticipated thrust loads on an inclined ball-contact alignment, suggested at 21.

In accordance with the invention, the other shoulder 20 of the outer ring 12 is of lesser bulk and extent than the shoulder 19 and is internally profiled for axial-detent coaction with the retainer 10, upon assembly thereto. In FIG. 2, this profiling is identified at an inward radial bead or flange 22 located between the raceway 17 and the end of the ring 12. A chamfer 23 at this end (and adjacent the bead 22) provides ramp or piloting access for retainer assembly into the outer ring 12.

The retainer 10 is of sheet metal such as a suitable steel. It comprises a circumferentially continuous, generally radially extending body portion 24 with integral axially extending spaced-finger elements 25–26, at angular spacings around the body 24. The retainer 10 may thus be viewed as generally channel shaped, with radially outer and radially inner finger elements 25–26 formed by cuttings from the sidewalls of the channel shape. The balls 13 are spaced by these finger elements, and the finger elements terminate short of the radially extending part of body 24 to avoid ball contact therewith. As shown, suitably deburred edges 27–28 are presented for smooth contact with the ball, at outer and inner ball-retaining limits, respectively straddling the circular locus 29 of ball centers.

The radially outer finger elements 25 are of greater elongation than their inner counterparts 26, although they both are initially parallel. The inner finger elements 26 extend short of the radial plane of ball centers, and the outer finger elements extend beyond this plane. Thus, the outer finger elements 25 comprise a first or root section 30 which extends axially past the ball-center plane 18; thereafter, elements 25 are bent radially toward their corresponding elements 26 in an inwardly directed second section 31 which straddles the ball-center locus 29, and they are finally bent back axially in a third section 32 which extends substantially to or through the ball-center plane 18. As seen in FIG. 1, each ball 13 is loosely retained in clearance with adjacent pairs of finger elements 25–26, there being slight angular overlap (at 33) of each of the finger sections 31 with each of the balls adjacent thereto. The space D between corresponding adjacent ball-retaining limiting portions 33 of adjacent finger elements 25 will be seen to be less than the ball diameter over a region extending substantially outward of the ball-center locus 29, thus assuring axial retention of the balls. By the same token, the space between corresponding adjacent areas of the ball-limiting portions 30 of adjacent finger elements 25, and the space between corresponding adjacent areas of the ball-limiting portions 32 of adjacent finger element 25, are both slightly less than the ball diameter. It will also be noted that a substantial degree of radial freedom is afforded the balls 13, particularly in the radially inward direction, as denoted by the extent ΔR shown in FIG. 1; ΔR in FIG. 1 will be understood to designate the extent of radially inward freedom of retained ball displacement from the normal running relation shown in solid outline, to the innermost position, suggested by phantom outline 13', where interference is encountered with finger regions 32. Thus displaced, all balls 13 will be seen to be capable of assuming positions within the nominal outer confines 34 of the finger elements 25; and this dimension at 34 freely clears the bead 22 of the outer bearing ring.

In accordance with the invention, one or more of the finger elements 25 is provided with an integral radially extending detent projection 35 of such proportions as to slightly interfere with bead 22 upon axial assembly. Preferably, such detent projections are provided at every odd finger element location in their circumferential succession. Thus, in Fig. 1, the leftmost finger element 25' has no detent projection 35; the next adjacent finger element 25 (central location in Fig. 1) has a detent 35, and the next succeeding finger element 25' (rightmost in Fig. 1) has no detent.

With the described structure, ball assembly to the retainer 10 is accomplished by successive generally radially inward snapped entry of the balls into the pockets, past the slight interference afforded between opposed adjacent areas of adjacent finger portions 30. Resilient radial displacement of finger elements 25 accommodates the slight interference, and the displacement is purely transient, well within the yield point of the retainer material. A first unit-handling preassembly is thus completed and need never be disturbed, unless balls are to be replaced.

Next, the described subassembly is axially telescoped within the outer ring 12 using the chamfer 23 to pilot both the retainer body and the balls past the bead 22. Of course, interference is encountered between detent projections 35 and the bead 22, but the interference is overcome by local resilient radially inward displacement of the odd-numbered finger elements 25. Again, such displacement is purely transient and well within the yield point of the retainer material. This new subassembly remains unit-handling until deliberate disassembly by way of the detent action already described, and of course, final assembly to the inner ring 11 is easily accomplished via the ramp 16.

The arrangement of Figs. 4 and 5 utilizes a slightly different retainer 10' to perform analogous functions for balls 13 between the bearing rings 11–12. The retainer ring 10' is again generally channel shaped, but the base portion 40 thereof is on that side of the balls on which the ramp 16 is located, thus utilizing the greater radial clearance afforded between bearing rings at ramp 16. Outer and inner finger elements 41–42 are again cut from sidewalls of the channel shape. The outer finger elements 41 are again of greater elongation than the inner finger elements 42, but the bends of these elements are such as to establish more deliberate symmetry of ball-limiting contact with respect to the thrust alignment 21 for each ball 13. Thus, for the outer finger elements 41 a first straight portion 43 provides ball-stabilizing contact on one side of the alignment 21 and radially outside the locus 29 of ball centers, and reverse bend 44 positions another ball-stabilizing contact portion 45 on the other side of the alignment 21 and radially outside the locus 29. Similarly, the inner finger element 42 has an outwardly curved end 46 for arcuate ball-stabilizing contact on both sides of the alignment 21 and radially inward of the locus 29. The reverse bend 44 has a maximum radial extent which exceeds the minimum diameter of the bead or flange or shoulder 48, to the extent designated $I$, thereby providing detent interference as previously described for the projections 35.

Assembly is as previously described, in that balls 13 are first snapped radially into the pockets between fingers 41, being then fully retained as a first preassembly. This preassembly is then telescoped into the small shouldered end of outer ring 12, past the point of transient detent action, and into fully retained unit-handling relation of the balls, the retainer and the outer bearing ring. Thereafter, final assembly is completed over the ramp 16.

The arrangement of Figs. 7 and 8 is similar to that of Figs. 5 and 6 except that the sidewalls of the channel shape of retainer 10'' are cut arcuately, rather than being bent, to achieve the ball-stabilizing and retaining functions. Thus, the circumferentially continuous base or bottom 50 of the channel shape is sloped radially and axially so that the sidewalls may extend more generally transverse of the angular contact alignment 21. The arcuate cutouts in these walls are centered generally on the alignment 21, on radii less than that of the balls 13. Thus, radially outer fingers 51 have ball-stabilizing contact on opposite sides of the alignment 21 and radially outside the locus 29; and radially inner fingers 52 have ball-stabilizing contact on opposite sides of the alignment 21 but radially inside the locus 29. The radially outer limit of outer fingers 51 exceeds the throat or minimum bore diameter of bead 48, to the extend I, as previously described; and this outer limit is preferably round in contour, for easier detent action.

Assembly is, again, as previously described. Balls are first snapped in their pockets between opposed adjacent edges of adjacent fingers 51 (and 52) to create the retained-ball subassembly. This subassembly is then telescoped into the small-shouldered end of the outer ring 12, past the resilient detent-action interference of parts 51–48. The resulting product is a unit-handling subassembly of outer ring with retainer-spaced balls, and this subassembly may be disassembled by nonpermanent deformation past the detent region. Final assembly to ring 11 is up the ramp 16.

Fig. 8 illustrates an all-plastic retainer 60 of the invention. This retainer, which may be injection molded, comprises a circumferentially continuous body portion 61 with integral axially extending finger elements 62 at angularly spaced intervals. Concavities 63 provide ball clearance so that ball-stabilizing contact may be at 64–65 on both axial sides of the plane of ball centers. Also, ball-stabilizing contact is provided at a radially inner location 66 and at smaller or nib projections 67 radially outside the locus of ball centers. The opposed radially outer nibs 67 of adjacent fingers 62 are spaced less than the ball diameter but yield resiliently to permit ball insertion, with gentle snap action. These nibs 67 are formed at the angularly spaced limits of a local radially outward detent projection 68, having detent interference with the throat or bead 22 (48). Assembly is as previously described.

It will be seen that the invention meets the stated objects without introducing any additional parts or complexity. At the same time, assembly is facilitated by employing various successively subassembled unit-handling relationships. The result aids initial fabrication as well as inspection and maintenance.

While the invention has been described in detail for the preferred forms shown, it will be understood that modifications may be made without departing from the scope of the invention. For example, the detent retention of the ball-loaded retainer may involve coaction with a double-shouldered inner ring, upon suitable application of the inventive principle to an inner projection or projections on the retainer.

What is claimed is:

1. In combination, a ball-bearing race ring having a circumferentially continuous ball raceway of generally circularly arcuate section defined between axially spaced radially extending shoulders, a retainer ring having a circumferentially continuous body of radial dimensions to axially overlap one of said shoulders adjacent said raceway while in radial clearance with said race ring, said retainer ring including radially projecting means having local resilient detent-action interference with one of said shoulders upon axial assembly of said rings, said retainer ring including a plurality of angularly spaced ball-retaining fingers extending axially from said body and spanning the central radial plane of raceway curvature, and balls in the spaced between said fingers; the space between corresponding limits of adjacent fingers at a location (a) axially offset from said plane in the direction away from said body and (b) radially offset from the ball center locus in the direction away from said raceway, being less than the ball diameter, whereby said combination may be unit handling and self-retaining, in readiness for selective assembly to the mating other race ring of an angular contact bearing via the nonshouldered end thereof.

2. In combination, a ball bearing race ring having a circumferential shoulder adjacent a ball raceway, retainer ring having a circumferentially continuous body with plural equally angularly spaced ball-retaining fingers extending to one axial side of said body to define ball-retaining pockets for balls of a diameter to ride said raceway when positioned by said pockets, such balls to be retained with the locus of ball centers in a radial plane offset from one side of said body; balls of said diameter in said pockets; said fingers including corresponding first, second and third ball-retaining limits axially straddling the radial plane of ball centers and radially straddling the radius of the locus of ball centers, the space between adjacent corresponding ball-retaining limits of adjacent fingers being less than said ball diameter, and said fingers being spaced to clear said balls when equally spaced and aligned on said locus; and resilient radially projecting detent means in clearance relation with said raceway when assembled, forming an integral part of said ring and having detent coaction with a shoulder of said race ring upon axial assembly of said retain ring thereto.

3. The combination of claim 2, in which said retainer ring is formed from a single sheet of metal, said fingers including elements bent axially from and integral with said body at one of the radial limits thereof, said detent means being formed in at least one of said finger elements.

4. The combination of claim 3, in which said detent means comprises like radial projections formed in a plurality of said finger elements at equal intervals thereof.

5. The combination of claim 4, in which the number of finger elements is even and in which said detent projections occur at every odd finger element in the circumferential succession thereof.

6. The combination of claim 3, in which said retainer ring is generally channel shaped, the base of the channel being circumferentially continuous and constituting the major part of said body, both sidewalls of the channel shape extending to one axial side of said body, said sidewalls being cut away at corresponding angular locations to define corresponding radially outer and radially inner finger elements.

7. The combination of claim 6, in which the cut outs for angularly adjacent edges of adjacent finger elements are generally circularly arcuate with a radius less than the ball radius.

8. The combination of claim 6, in which the cut outs for angularly adjacent edges of adjacent finger elements are axially elongated to define axially elongated finger elements, said axially elongated finger elements for one of said channel walls being bent radially toward the corresponding finger elements of the other of said channel walls, the bends being at axial locations offset from the plane of ball centers in the direction away from said body.

9. The combination of claim 8, in which the finger elements for the other of said channel walls is bent radially toward the corresponding finger elements of the other of said channel walls, the latter bends being also at locations offset from the plane of the ball centers in the direction away from said body.

10. The combination of claim 8, in which said finger elements of said one channel wall are further bent back toward said body after radially straddling the locus of ball centers.

11. The combination of claim 2, in which said retainer ring is of single-piece plastic construction.

12. An angular-contact ball bearing, comprising inner and outer race rings with plural balls riding the raceways of said rings, the raceway of one of said rings being of arcuate section extending on both axial sides of the plane of ball centers thereby defining two radial shoulders facing the other race ring on axially opposite sides of said plane, a circumferentially continuous retainer retaining the balls in spaced relation and in preassembled relation with the raceway of said one ring, the raceway of the other of said rings being also of arcuate section but limited to one axial side of said plane thereby defining a radial shoulder on the raceway side of said plane, said other ring being cut away on the opposite axial side of said plane to define a nonshouldered axially open side for assembly of said other race ring to said preassembly; said retainer and balls comprising a preassembly retaining said balls with such clearance as to permit assembly of the preassembled retainer ring and balls axially past one of the shoulders of said one race ring, said one shoulder and said retaining ring having transient coacting resilient detent engagement in the course of assembly.

13. The bearing of claim 12, in which said detent engagement is a two-way acting, whereby integrity of the preassembled retainer ring and balls may be retained after removal from said one race ring, or whereby integrity of the preassembly of said one race ring with said balls and retainer ring may be retained after disassembly from said other race ring, as may be desired for periodic selective inspection and maintenance of said bearing.

14. The bearing of claim 12, wherein said one race ring and said other race ring are respectively the outer and inner rings of said bearings.

* * * * *